Sept. 14, 1954 J. C. MACY Re. 23,869

CONNECTOR

Original Filed Oct. 10, 1944

INVENTOR
JAMES C. MACY.
BY
Blair, Carter & Hayward
ATTORNEYS

Reissued Sept. 14, 1954

Re. 23,869

UNITED STATES PATENT OFFICE 23,869

CONNECTOR

James C. Macy, Elizabeth, N. J., assignor to Aircraft-Marine Products Inc., Harrisburg, Pa., a corporation of New Jersey Original No. 2,416,335, dated February 25, 1947, Serial No. 558,002, October 10, 1944. Application for reissue August 6, 1947, Serial No. 766,755

5 Claims. (Cl. 287—76)

Matter enclosed in heavy brackets [ ] appears in the original patent but forms no part of this reissue specification; matter printed in italics indicates the additions made by reissue.

This invention relates to connectors and particularly to connectors of the knife disconnect type adapted for connecting electrical conductors, that is, connectors which are adapted to interengage with counterpart terminals by insertion of a blade portion between two parts which engage it with resilient face-to-face contact.

Connectors of the general type to which this invention is directed are disclosed and claimed in the co-pending application of William S. Watts, Serial No. 530,296, filed April 10, 1944, *now Patent No. 2,478,143*. In one type of connector particularly claimed in said copending application, the counterpart terminals have each one clip extending from a lateral edge near one end and a blade portion between the clip and a ferrule or other portion for attaching the connector to one of the members which are to be connected. In use the portion of the blade between the clip and the attaching portion is inserted between the clip and adjacent face of the blade. The counterpart connectors of this type are engaged or disengaged only when at an angle to each other and are locked when brought into alignment. Thus the connection is readily secured against separation by fitting a sheath over the connection which restrains angular movement of the counterpart connectors. In some cases, when it is desired to omit such sheath and special conditions are encountered which may tend to produce angular movement, it is desirable to have a connector which locks itself against accidental disconnection.

It is an object of the present invention, therefore, to provide a connector of the knife disconnect type in which provision is made in the connector itself not only against accidental separation of the terminals by either lengthwise pull or lengthwise thrust but also against separation by angular movement of the parts. To this end the invention contemplates the provision of means slidable along the blade portion but limiting relative lateral movement of the blades in the connected relation. Especially as such means, the invention contemplates clips at opposite edges of the blade of each connector; at least one of the clips extending back over the face of the blade member which carries the clip and spaced from it less than the thickness of the blade which is to enter between them, whereby such blade is engaged under pressure in face-to-face contact. Both clips extend up from the edges of the blade so that they tend to prevent relative angular movements of the contacting blades in either direction.

In one specific form of the invention it is an object to provide a connector of the knife disconnect type in which each of the blades of the counterpart terminals has two clips extending back over the blade from opposite edges so that each blade is pressed at both edges against the blade of a counterpart connector.

Another important object, in one specific form of the invention is the provision of a stop located between the lateral edges of each blade and over which the counterpart blade is deflected with resilient deformation during the connecting and disconnecting movements thereof and which block accidental lengthwise disengagement when the switches are in their closed condition.

Other objects and important features of the invention, to which reference has not specifically been made hereinabove, will appear hereinafter when the following description and claims are considered in connection with the accompanying drawings.

Although in this specification and the accompanying drawings I am showing and describing a particular example and various modifications thereof, it should be understood that these are not intended to be exhaustive or limiting of the invention, but on the contrary are chosen and presented for purposes of illustration and in order to explain the principles of the invention and the practical employment of those principles in applying the invention to practical use, and thus to so fully instruct others skilled in this art that they will be enabled readily to modify and to select and substitute alternatives, each as may be best suited to the particular conditions of any given application or use.

Figure 1:
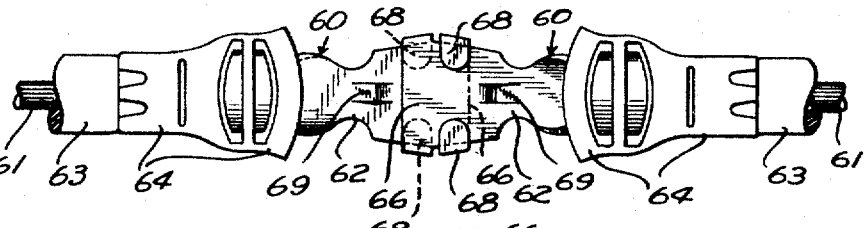
Figure 1 is a plan view of a connector embodying the present invention, the connector being shown in its closed condition and with conductors connected to the counterpart terminals.
Figure 2:
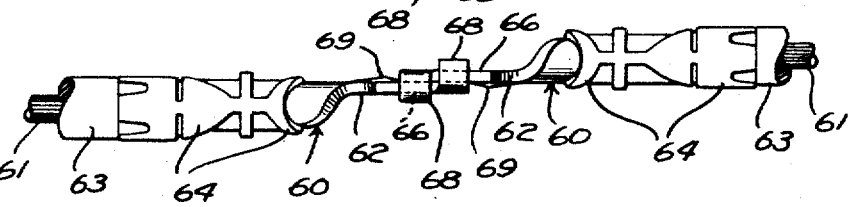
Figure 2 is a side elevation of the parts shown in Figure 1.

In the embodiment of the invention shown in Figures 1 and 2, counterpart connector terminals are attached to insulated flexible wire conductors by crimped ferrules. These terminals may be stamped up from sheet metal, such as pure, high conductivity, electrical copper. Each terminal comprises a ferrule 60 rolled up from the sheet metal to receive the stripped end of the electrical conductor 61, a narrow neck portion 62, for a purpose hereinafter set forth and a wide blade portion 66. Each of the blade portions 66 is provided on each lateral edge of the end part thereof remote from the ferrule 60 with a clip 68, each clip 68 in this case extending back over the face of the blade 66 and spaced therefrom, when free, slightly less than the thickness of the engaged counterpart blade 66 whereby they have pressure engagement with the opposite face of the counterpart blade member of the engaged connector.

From the foregoing description it will be seen that the connector of the present invention differs from the specific connector of the copending application of William S. Watts, hereinabove identified and that of the application of James C. Macy, Serial No. 530,317, filed April 10, 1944, in that, instead of comprising a single clip which engages the counterpart blade beside the clip thereon, the connector of the present invention has also, upon the other edge of each blade member of the connector, a clip which prevents relative angular movement of the blades in their interengaged relation. This second clip may be merely an abutment or may, like the clip on the opposite edge, extend back over the face of the blade so as to press the counterpart blade into face-to-face contact therewith. It will further be seen that these knife contacts cannot be released by mere angular relative movements of the blades but involve in their release a lengthwise relative thrust movement of the blades.

Like the connector of the copending applications, however, the clips 68 are so located on the blade 66 that when the connectors are closed together the clips prevent separation of the parts by a lengthwise pull. To prevent accidental separation by a lengthwise thrust stop means may be provided such, for example, as that illustrated which comprises a low hump 69 stamped up from the material of each blade between the lateral edges thereof and so located on the clip side of the blade that the counterpart blade, must snap over this stop when the parts are moved into the switch closing position shown in the drawings. The height of this hump is less than would cause an inelastic deformation of the connector, but is sufficient to require a thrust greater than would be accidentally imposed on the wire. If accidental thrust may be very great, spring clips or stops may be used in lieu of the integral parts as shown. It will thus be seen that this stop 69 is so located that it tends to prevent disconnection by endwise thrust of the parts.

The connector of the present invention is of the so-called solderless type and the counterpart terminals which make up the connector may be connected to their conductors without the use of solder, as more fully set forth in a copending application of Stephen N. Buchanan, Serial No. 421,408, filed December 3, 1941. As herein shown, the insulation 63 is protected and supported by a sleeve 64 which may be of seamless drawn tubing, the sleeve 64 being crimped into interlocking relation with the ferrule 60 and the stripped end of the conductor 61, as shown in the drawings, while the end of the sleeve 64 which supports and protects the insulation 63 is at the same time crimped into interlocking and supporting relation to the insulation.

In Figures 3 to 6, inclusive, I have shown other examples of my invention wherein instead of using identical clips at opposite sides, only one of the clips 68a or 68b is brought back over the face of the blade member 66a or 66b with a spacing such that the counterpart blade is pressed into tight conductive relation. The other clip 70 is merely turned up to form an abutment holding the counterpart blade member against lateral withdrawal from the clip 68. With this arrangement the blade needs to be recessed at only one side, as shown at 62a and 62b.

Figure 3:
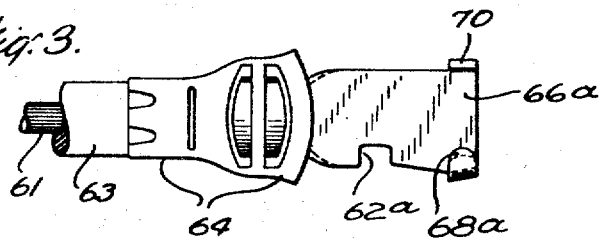
Figures 3 and 4 are views in side and end elevation, respectively, showing a modified form of the invention.
Figure 4:
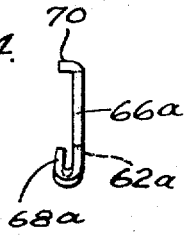

In the examples shown in Figures 3 and 4, the use and operation are as described above in connection with Figures 1 and 2. The clip 68a of each of the counterpart terminals enters through the recess 62a of the other terminal and the two are then pulled until the clips 68a have slide over the counterpart blade portions. The resulting connection is secure against any stress which is likely to be imposed upon it by the wires which are connected by it; if further security against disconnection is required a latch, e. g. a hump such as is shown at 69 in Figures 1 and 2, may be provided.

Figure 5:
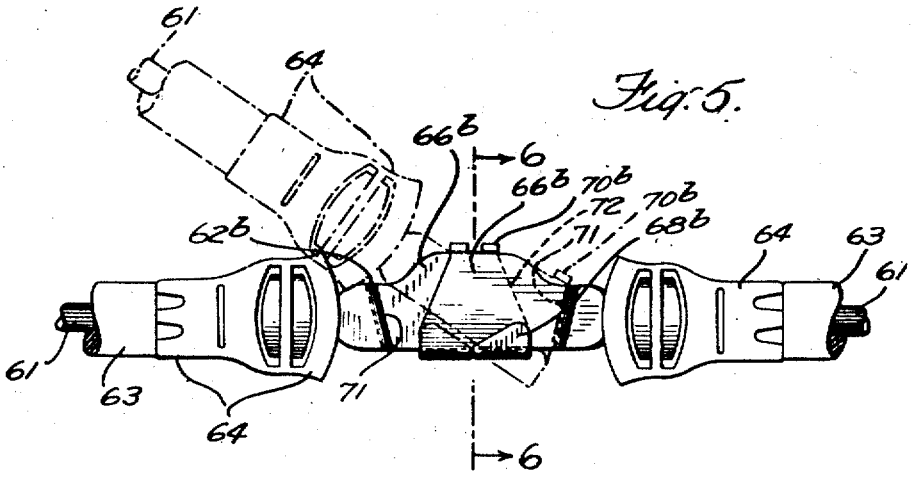
Figure 5 is a view similar to Figure 1 of another modified form.
Figure 6:
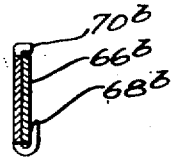
Figure 6 is a sectional view taken on line 6—6 of Figure 5.

In the example illustrated in Figures 5 and 6, the clip 68b is on the straight side of the blade while the clip 70b is on the recessed side. This requires a swinging of the blades to an angle as the easiest method of engaging and disengaging the clips 68b. The blade is made with a bend forming a shoulder at 71 and the end of the blade at 72 is at an angle which positions the blade for engagement or disengagement. As illustrated, this is substantially perpendicular to the edge of the clip 68b. Thus, when the end 72 is pushed against the shoulder 71 of the counterpart terminal and brought into line with it, the edge of the clip 68b on each of the terminals is parallel to the edge of the blade 66b of the other terminals. In this angular position of counterpart terminals the clip 70b falls into the recess 62b. When the terminals are then pulled into alignment, blade 66b of each terminal enters under the clip 68b of the counterpart terminal and the clip 70b of the terminal rides up over the edge of the recess portion 62b and onto the edge of the blade portion 66b. Further tension on the wires pulls the terminals into the position shown in Figure 5, wherein the clips 68b and 70b hold the blades in their aligned relation against disconnection by any stress but a co-axial thrust. Separation of the terminals requires both a co-axial thrust and a subsequent lateral stress producing an angular break between the terminals.

From the foregoing description it will be seen that the connector of the present invention, when the parts are in the relations to each other shown in Figures 1 and 2 of the drawings, insures a good electrically conductive connection between the terminals and that the employment of stop means, such as the auxiliary clip, so located upon each of the counterpart blade members of the knife contacts as to prevent accidental angular movement of these blade members into disconnected relation to the clip members of the contacts, insures a connection, without outside support, which is not liable to accidental disconnection.

I claim:

[1. A separable connector which comprises an attaching portion adapted to be permanently attached to one of the parts which are to be connected by it and a counterpart connector, a blade portion at least a plane contact face of which is adapted to lie in face-to-face contact with a plane face of the blade of a counterpart connector when the connectors are interengaged, and a clip member extending from at least one edge of the blade portion across a portion of said contact face and spaced from it when free a distance less than the thickness of the counterpart blade, whereby to press the counterpart blade and blade portion in said face-to-face contact when interengaged, and limit means upstanding from the opposite lateral edge of said blade portion above the level of said contact face to engage a lateral edge of said counterpart blade to limit relative sidewise displacement of the blade portion and counterpart blade when interengaged while permitting relative longitudinal displacement, and a part of the blade portion between said attaching portion and the portion comprising a clip and the limit means being recessed to allow entry of the blade between the clip and limit means and under the clip of a counterpart connector.]

[2. A separable connector which comprises an attaching portion adapted to be permanently attached to one of the parts which are to be connected by it and a counterpart connector, a blade portion a part of which is adapted to lie in face-to-face contact with a contact portion of the blade of a counterpart connector when interengaged, and clip members at opposite edges of one end of the blade portion to engage the edges of the counterpart blade to limit sidewise relative displacement of the blade portion and counterpart blade when interengaged, at least one of which clips extends across a portion of said contact face and is spaced from it when free a distance less than the thickness of the counterpart blade, whereby to press the counterpart blade and blade portion in said face-to-face engagement and a part of the blade portion between that part which carries the clips and said attaching portion being recessed to allow entry of the blade between the clips of a counterpart connector.]

[3. A connector according to claim 1 in which the limit means is also a clip member, and both the clip members are similar and symmetrically positioned, whereby the blade and blade portion, when interengaged, are resiliently pressed into face-to-face contact by resilient pressure of the clip members at opposite edges and opposite sides, and the recessed portion of the blade is symmetrically recessed to pass the opposite clip members of a counterpart connector.]

[4. A connector according to claim 1 in which the blade portion is provided between its lateral edges with a stop over which the counterpart blade is snapped during the interengaging movement thereof to resist accidental disengagement.]

[5. A connector according to claim 1 in which the limit means is also a clip member, both the clip members are similar and extend across the contact face at a spacing from it less than the thickness of the blade portion, the blade portion being tapered in both longitudinal directions from a maximum width adjacent the clip members on the side thereof toward the attaching portion and each blade portion being so reduced in width toward its attaching portion that the narrow part thereof may be inserted between the clip members of a counterpart connector and the blade portion then moved lengthwise into engagement under both clip members, said blade portion being provided between its edges with a stop over which the blade of the counterpart connector may be snapped during interengaging movement thereof, to resist accidental disengagement.]

*6. A separable connector which comprises an attaching portion adapted to be permanently attached to one of the parts which are to be connected by it and a counterpart connector, a blade portion at least a plane contact face of which is adapted to lie in face-to-face contact with a plane face of the blade of a counterpart connector when the connectors are interengaged, a clip portion extending from at least one edge of the blade portion across a portion of said contact face, limit means upstanding from the opposite lateral edge of said blade portion above the level of said contact face to engage a lateral edge of said counterpart blade to limit relative sidewise displacement of the blade portion and counterpart blade when interengaged while permitting relative longitudinal displacement, and a low hump formed on said blade portion adapted to serve as a lock to hold said connector and said counterpart connector against accidental disengagement, said hump being formed to a height less than would cause an inelastic deformation of the connector upon engagement or disengagement.*

*7. A pair of separably interengaged counterpart connectors each of which comprises an attaching portion adapted to be permanently attached to one of the parts which are to be connected by it and its counterpart connector, a blade portion at least a plane contact face of which lies in face-to-face contact with a plane face of the blade of the counterpart connector while the connectors are interengaged, a clip member extending from at least one edge of the blade portion across a portion of said contact face and spaced from it a distance equal to the thickness of the counterpart blade, whereby to hold the interengaged counterpart blade and said blade portion in face-to-face contact, limit means upstanding from the opposite lateral edge of said blade portion above the level of said contact face to engage a lateral edge of said counterpart blade to limit relative sidewise displacement of the blade portion and counterpart blade while permitting relative longitudinal displacement, and a low hump formed on said blade portion adapted to serve as a lock to hold said connector and said counterpart connector against accidental disengagement, said hump being formed to a height less than would cause an inelastic deformation of the connector upon engagement or disengagement.*

*8. A separable connector which comprises an attaching portion adapted to be permanently attached to one of the parts which are to be connected by it and a counterpart connector, a blade portion at least a plane contact face of which is adapted to lie in face-to-face contact with a plane face of the blade of a counterpart connector when the connectors are interengaged, a first clip member extending from at least one edge of the blade portion across a portion of said contact face and spaced from it when free a distance less than the thickness of the counterpart blade, whereby to press the counterpart blade and blade*

*portion in said face-to-face contact when interengaged, a second clip member upstanding from the opposite lateral edge of said blade portion above the level of said contact face to engage a lateral edge of said counterpart blade to limit relative sidewise displacement of the blade portion and counterpart blade when interengaged while permitting relative longitudinal displacement, said clip members being similar and symmetrically positioned, and a part of the blade portion between said attaching portion and the portion comprising said clip members being symmetrically recessed to allow entry of the blade between the clip members and under the clip members of a counterpart connector.*

*9. A separable connector which comprises an attaching portion adapted to be permanently attached to one of the parts which are to be connected by it and a counterpart connector, a blade portion at least a plane contact face of which is adapted to lie in face-to-face contact with a plane face of the blade of a counterpart connector when the connectors are interengaged, a clip member extending from at least one edge of the blade portion across a portion of said contact face and spaced from it when free a distance less than the thickness of the counterpart blade, whereby to press the counterpart blade and blade portion in said face-to-face contact when interengaged, limit means upstanding from the opposite lateral edge of said blade portion above the level of said contact face to engage a lateral edge of said counterpart blade to limit relative sidewise displacement of the blade portion and counterpart blade when interengaged while permitting relative longitudinal displacement, a part of the blade portion between said attaching portion and the portion comprising a clip and the limit means being recessed to allow entry of the blade between the clip and limit means and under the clip of a counterpart connector, and said blade portion being provided between its lateral edges with a stop over which the counterpart blade is snapped during interengaging movement thereof to resist accidental disengagement.*

*10. A separable connector which comprises an attaching portion adapted to be permanently attached to one of the parts which are to be connected by it and a counterpart connector, a blade portion at least a plane contact face of which is adapted to lie in face-to-face contact with a plane face of the blade of a counterpart connector when the connectors are interengaged, a first clip member extending from at least one edge of the blade portion across a portion of said contact face and spaced from it when free a distance less than the thickness of the counterpart blade, whereby to press the counterpart blade and blade portion in said face-to-face contact when interengaged, a second clip member extending from the opposite lateral edge of said blade portion across a portion of said contact face and spaced from it when free a distance less than the thickness of the counterpart blade, said blade portion being tapered in both longitudinal directions from a maximum width adjacent the clip members on the side thereof toward the attaching portion and each blade portion being so reduced in width toward its attaching portion that the narrow part thereof may be inserted between the clip members of a counterpart connector and the blade portion then moved lengthwise into engagement under both clip members, and said blade portion being provided between its edges with a stop over which the blade of the counterpart connector may be snapped during interengageing movement thereof to resist accidental disengagement.*

References Cited in the file of this patent or the original patent

UNITED STATES PATENTS

| Number | Name | Date |
|---|---|---|
| 59,007 | Gridley | Oct. 23, 1866 |
| 2,478,143 | Watts | Aug. 2, 1949 |

FOREIGN PATENTS

| Number | Country | Date |
|---|---|---|
| 78,191 | Austria | Sept. 10, 1919 |